United States Patent
McKenzie et al.

(10) Patent No.: US 6,886,113 B2
(45) Date of Patent: Apr. 26, 2005

(54) SYSTEM AND METHOD FOR DETERMINING AND PRESENTING NETWORK PROBLEMS

(75) Inventors: William F. McKenzie, Raleigh, NC (US); Kelly A. Revels, Selma, NC (US)

(73) Assignee: Lucent Technologies Inc., Murray Hill, NJ (US)

( * ) Notice: Subject to any disclaimer, the term of this patent is extended or adjusted under 35 U.S.C. 154(b) by 599 days.

(21) Appl. No.: 09/873,828

(22) Filed: Jun. 4, 2001

(65) Prior Publication Data

US 2002/0184554 A1 Dec. 5, 2002

(51) Int. Cl.[7] .............................................. G06F 11/00
(52) U.S. Cl. ............................ 714/48; 714/4; 709/223
(58) Field of Search ............................... 714/4, 48, 49, 714/57; 709/223

(56) References Cited

U.S. PATENT DOCUMENTS

| | | | | |
|---|---|---|---|---|
| 5,600,791 A | * | 2/1997 | Carlson et al. | 714/47 |
| 5,892,898 A | * | 4/1999 | Fujii et al. | 714/57 |
| 5,907,674 A | * | 5/1999 | Koeninger et al. | 714/57 |
| 6,421,740 B1 | * | 7/2002 | LeCroy | 719/331 |
| 6,438,716 B1 | * | 8/2002 | Snover | 714/57 |
| 6,526,524 B1 | * | 2/2003 | Kelley | 714/38 |
| 6,629,060 B1 | * | 9/2003 | Okuno et al. | 702/187 |
| 6,654,915 B1 | * | 11/2003 | Lu et al. | 714/57 |

* cited by examiner

*Primary Examiner*—Robert Beausoliel
*Assistant Examiner*—Emerson Puente (57) ABSTRACT

A system and method for determining a cause of a network problem between a first endpoint and a second endpoint, is disclosed. Generally, a first computer is utilized comprising a transceiver, software stored within the first computer defining functions to be performed, and a processor configured by the software to perform the steps of: associating a received error message with an error identification number; and associating the error identification number with a root cause proximity value, wherein the root cause proximity value represents a relationship between the received error message and an actual cause of the network problem.

31 Claims, 7 Drawing Sheets

SYSTEM AND METHOD FOR DETERMINING AND PRESENTING NETWORK PROBLEMS

FIELD OF THE INVENTION

The present invention relates generally to network communication, and more particularly to a system and method for effectively determining and presenting problems associated with networks.

BACKGROUND OF THE INVENTION

Computer devices associated with a communication network typically report exceptions and abnormalities within the network by sending unsolicited messages to one or more predefined management stations. Such computer devices include, but are not limited to, routers, switches, hubs and servers that are connected to the network. The unsolicited notifications that are sent to the management stations, report device and network statuses and abnormalities from many diverse products and technologies.

The notifications have unique product identifiers, product-centric text, nonstandard style formats, and inconsistent technical level content which results in very few of the notifications being understandable by any typical network operation personnel. Simple network management protocol (SNMP) traps are one example of the unsolicited messages. As known in the art, a trap is an event that a router transmits to a network management station, wherein the event is a chain in the operation status of a router. SNMP traps often average over 1,000 characters in size and can utilize large amounts of network resources for transmission to the management station. In some environments, it is not unusual for millions of these notification messages to be generated on a daily basis. All of these notifications are typically logged to a single file, where they reside until they are eventually archived for long term storage.

The Internet engineering task force (IETF) has defined the structure and protocol for these SNMP traps, as well as defining the contents of five standard SNMP traps. Some products have "enhanced" these standards by adding additional variables to refine the meaning of the trap, which effectively make the trap not standard. The IETF addresses the product's unique requirements by defining an enterprise unique SNMP trap, which allows each reporting device to define unique messages and variables that will be "enveloped" into the SNMP trap. While this SNMP trap provides a powerful function for defining enterprise specific traps, it also complicates standardization efforts.

In addition to these network device generated notifications, network management applications typically perform status polling or network interface reachability monitoring that often results in the generation of additional notifications to report these reachability exceptional conditions. As an example, a single network circuit failure, such as, but not limited to, malfunction of a router may result in several network devices generating unsolicited notification messages to report multiple symptoms of the failed router, as well as notifications that may not be related to the specific router malfunction. At the same time, a network management application may generate hundreds of notifications reporting the inability to reach interface addresses on the far side of the failed router.

Another example may be where multiple network devices are connected together using a wide area network (WAN) or local area network (LAN) and a circuit connecting them is unstable such that the connection between the multiple network devices transitions between a good state and a bad state repetitively. In this situation, other affected network devices, as well as the management application, may generate many thousands of error notifications due to the single router failure. In addition to these network detected exceptions, many network users will be impacted by the failure, resulting in many additional problems being reported.

Unfortunately, there is no method of translating these diverse notification messages into a common format and terminology, since each product vendor documents its own unique messages. To further complicate this process, the many acquisitions and mergers of products over the years has resulted in the same lack of standardization within individual company product lines. Many of these notifications report status with numerical values representing a status or textual meaning of parts of the entire message. The numerical values are referred to as enumerated values wherein the enumerations are unique to each product and technology, requiring these specialized applications to translate the enumerated values to human readable format.

As noted hereinabove, the degree of complexity exists in processing high volumes of unsolicited notifications as well as providing a method to present these cryptic, complex, product-centric notifications to personnel who must interpret the meaning of the unsolicited notifications.

SUMMARY OF THE INVENTION

In light of the foregoing, the preferred embodiment of the present invention generally relates to a system and method for determining a root cause of a network problem between a first endpoint, such as, but not limited to, a first computer, and a second endpoint, such as, but not limited to, a second computer. Generally, describing the structure of the determination system, a first computer is utilized comprising a transceiver, software stored within the first computer defining functions to be performed, and a processor configured by the software to perform the following steps. The processor first associates a received error message with an error identification number, and secondly, associates the error identification number with a root cause proximity value, wherein the root cause proximity value represents a relationship between the received error message and an actual cause of the network problem.

The present invention can also be viewed as providing a method for determining a cause of a network problem between a first endpoint and a second endpoint comprising the steps of: associating a received error message with an error identification number; and associating the error identification number with a root cause proximity value, wherein the root cause proximity value represents a relationship between the received error message and an actual cause of said network problem.

The invention has numerous advantages, a few of which are delineated here after as examples. Note that the embodiments of the invention, which are described herein, possess one or more, but not necessarily all, of the advantages set out hereafter. One advantage of the invention is that it provides a method for filtering out low probability symptoms and focusing on the higher probability root cause messages.

Another advantage is that it provides a standardized manner of addressing network problems.

Other features and advantages of the present invention will become apparent to one with skill in the art upon examination of the following drawings and detailed description. It is intended that all such additional features and advantages be included herein within the scope of the present invention, as defined by the accompanying claims.

BRIEF DESCRIPTION OF THE DRAWINGS

The present invention will be more fully understood from the detailed description given below and from the accompanying drawings of the preferred embodiments of the invention, which, however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENT

The determination and presentation system (hereinafter, the determination system) of the present invention can be implemented in software, firmware, hardware, or a combination thereof. In the preferred embodiment of the invention, which is intended to be a non-limiting example, a portion of the system is implemented in software that is executed by a computer, for example, but not limited to, a server, a personal computer, workstation, mini computer, or mainframe computer.

The software-based portion of the determination system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus or device.

The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disk read-only memory (CD ROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Figure 1:
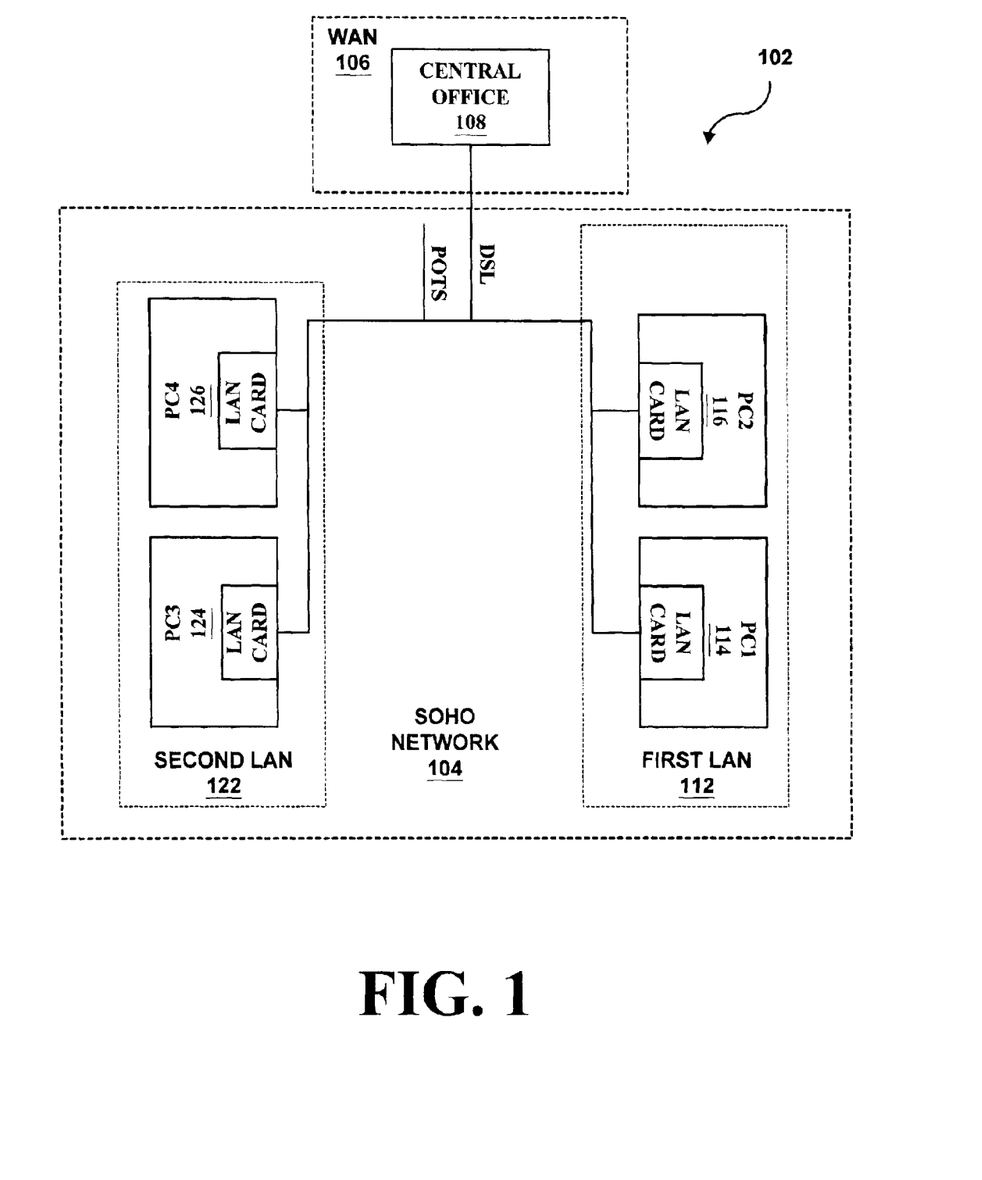
FIG. 1 is a block diagram illustrating a prior art software bridge/router system.
Figure 2:
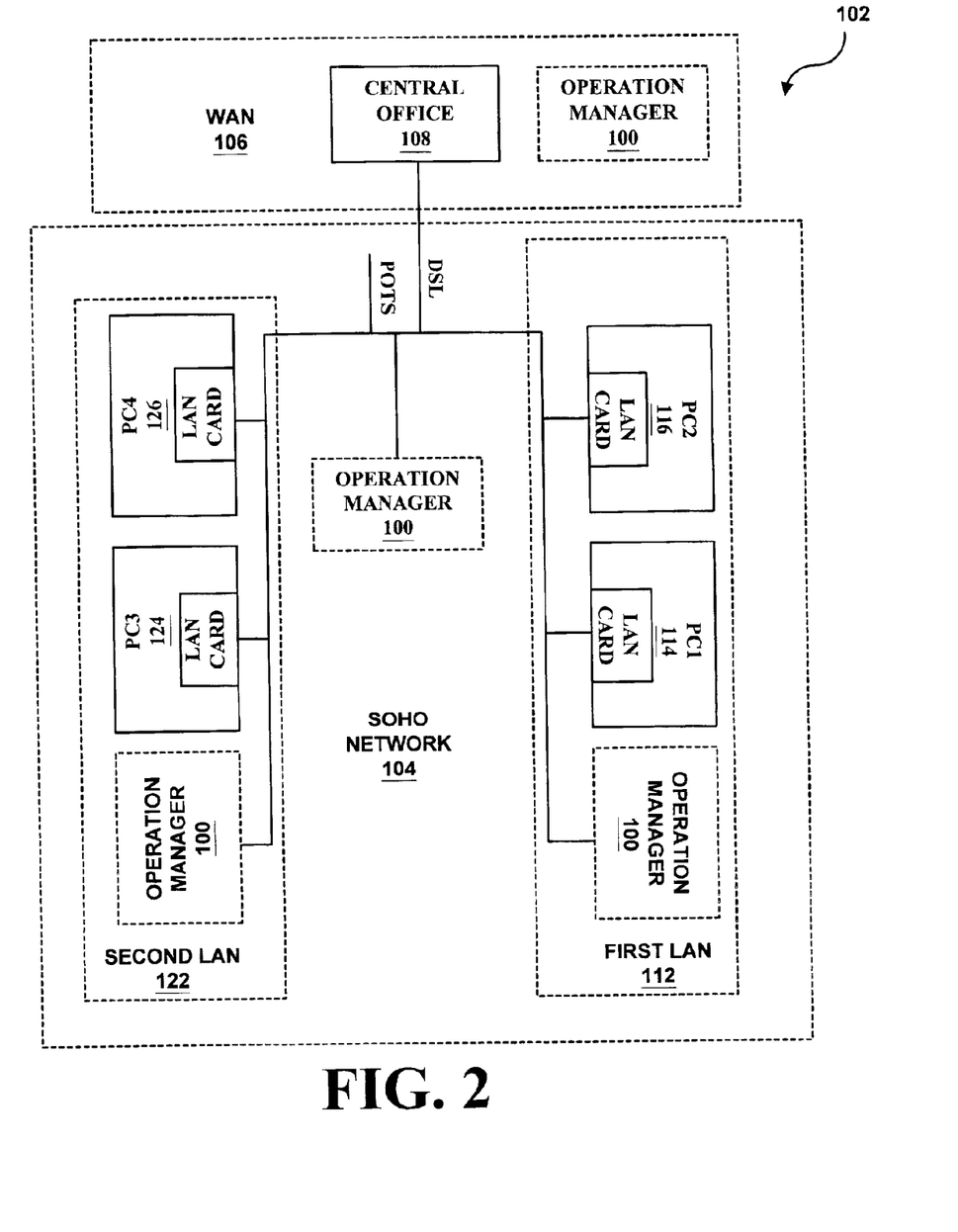
FIG. 2 is a block diagram that further illustrates the system of FIG. 1, wherein an operating manager has been provided in accordance with the preferred embodiment of the invention.

Referring now to the drawings, wherein like reference numerals designate corresponding parts throughout the drawings, FIG. 1 is a block diagram illustrating a prior art software bridge/router system 102 comprising a computer network located within a home, otherwise referred to as a small office, home office (SOHO) network 104, connected to a wide area network (WAN) 106, wherein an operation manager (not shown) may be provided. It should be noted that FIG. 1 is merely provided as an example of a communication network wherein the present operation manager may be implemented. It should be noted however that the present operation manager may be located within a different network, such as, but not limited to, a single local area network, a single SOHO network, or a single WAN. Further, in accordance with an alternate embodiment of the invention, the present operation manager may be provided in connection with two devices wherein unsolicited notifications of communication anomalies are provided to the operation manager. FIG. 2, described hereinbelow, provides for different locations of the operation manager.

Connection between the SOHO network 104 and the WAN 106 is preferably provided by a first digital subscriber line (DSL) modem located at the SOHO network 104 and a second DSL modem located at the WAN 106. As shown by FIG. 1, the SOHO network 104 comprises a first LAN 112 and a second LAN 122, either, or both of which are connected to a DSL and/or a plain old telephone service (POTS) line.

As known in the art, the WAN 106 comprises a central office 108 that provides for numerous types of services. Such services may include, but are not limited to, an asymmetric digital subscriber line (ADSL) services, high bit rate digital subscriber line (HDSL) services, symmetric digital subscriber line (SDSL) services, multi-rate digital subscriber line (MSDSL) services, and/or rate adaptive digital subscriber line (RADSL) services.

It should be noted that, while the present example describes use of two separate LANs within the SOHO network 104, one skilled in the art will appreciate that the number of LANs need not be limited to two, but instead may be more than two. In fact, the number of LANs within the SOHO network 104 may even be limited to a single LAN comprising a series of computers. Further, the number of POTS lines and DSL lines may also be different from the number illustrated within this example.

As shown by FIG. 1, the first LAN 112 comprises a series of computers therein, illustrated as PC1 114 and PC2 116. The second LAN 122 also comprises a series of computers therein, illustrated as PC3 124 and PC4 126. To provide LANs, each computer within the first and second LAN 112, 122 preferably contains a network interface card (NIC) that connects to a peripheral component interconnect (PCI) slot, thereby providing network capabilities within each respective network. Preferably, a LAN card is inserted into a PCI slot of its associated computer to provide networking capabilities such that the computers are logically connected as a first LAN and a second LAN.

Typically, as known in the art, if the first and second LAN 112, 122 are to be connected to allow communication amongst computers within the first and second LAN, a hub, such as, for example, a 10/100 base T hub, is installed, along with the installation of special cables from each computer within the SOHO network 104 to the hub. All computers typically have a NIC, such as, for example, a 10/100 Base T NIC, installed. Finally, each computer within each LAN has software added/configured to allow all computers therein to begin operation in a LAN environment.

A network management application may be located at the central office 108, or other locations, which is capable of receiving and generating unsolicited notifications concerning network device status or abnormalities in various formats from different diverse products and technology providers. It should be noted that other devices may be located within the system 102 that have not been illustrated herein.

FIG. 2 is a block diagram that further illustrates the system of FIG. 1 wherein the operation manager 100 has been provided, in accordance with the preferred embodiment of the invention. As shown by FIG. 2, the operation manager 100 may be located within the first LAN 112, the second LAN 122, the WAN 106, or within the SOHO network 104 between the first and second LANs 112, 122. It should be noted that the operation manager 100 may be provided external to the SOHO network 104 and WAN 106 wherein a communication link is provided to connect the SOHO network 104 and/or WAN 106 to the operation manager 100. Further, it is not necessary for more than one operation 100 to be located within the system 102, although more than one may be provided.

Figure 3:
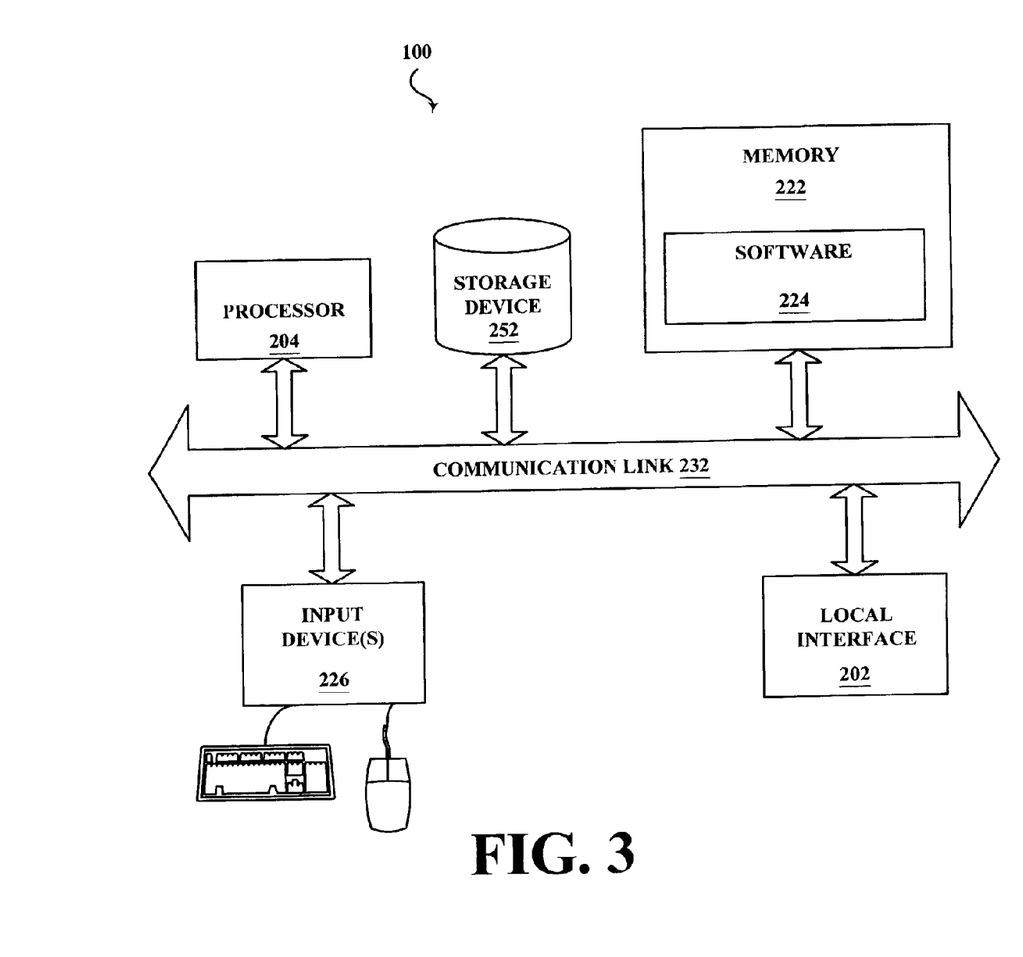
FIG. 3 is a block diagram that further illustrates the operation manager of FIG. 2.

FIG. 3 is a block diagram that further illustrates the operation manager 100 of FIG. 2. As shown by FIG. 3, a local interface 202 is located within the operation manager 100 for providing communication between the operation manager 100, and the WAN 106 and/or SOHO network 104. The operation manager 100 generally comprises a processor 204, a storage device 252, and a memory 222. Software 224 is provided within the memory 222 that defines functionality to be performed by the operation manager 100, as is defined in detail hereinbelow. The processor 204 accepts data from the memory 222 or a communication link 232, such as a bus(es) or a dedicated path. As an example, the communication link 232 may be a PCI bus.

The local interface 202 located within the operation manager 100 is preferably a PCI slot which is attached to the communication link 232 and provides for a peripheral device, such as a NIC card, to communicate with the WAN 106 and/or the SOHO network 104. An input device 226, or devices, may be connected to the operation manager 100 for purposes that are provided hereinbelow.

Figure 4:
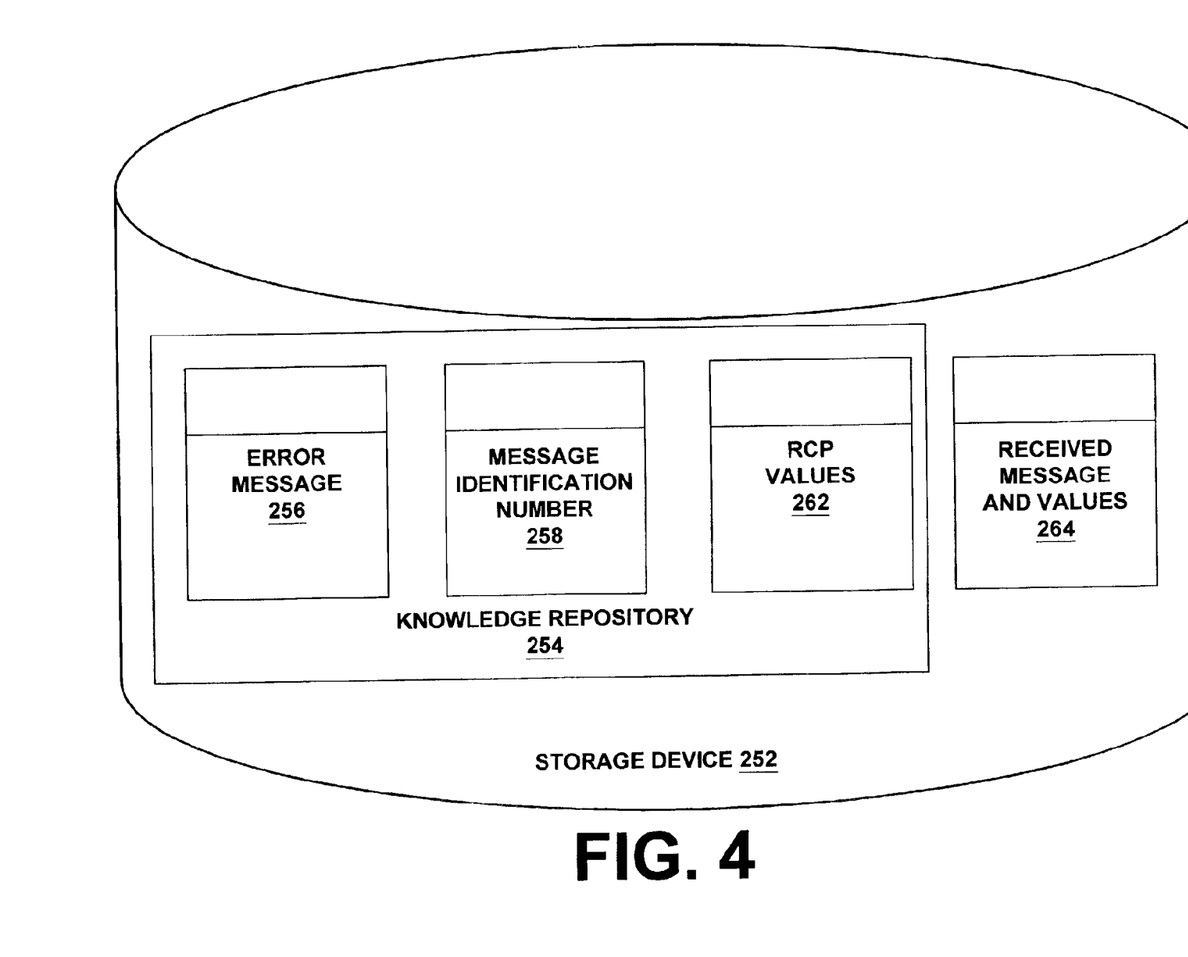
FIG. 4 is a block diagram that further illustrates the storage device of FIG. 3.

FIG. 4 is a block diagram that further illustrates the storage device 252 of FIG. 3. As shown by FIG. 4, a knowledge repository 254 is located within the storage device 252. It should be noted that the knowledge repository 254 may be located separate from the storage device 252 in an alternate embodiment. As an example, the operation manager 100 may be connected to an external database that comprises the knowledge repository 254.

Notification messages, also referred to as error messages, are stored within an error message portion 256 of the knowledge repository 254 which identifies known error messages that may be encountered by the present system 102. Preferably, network experts, product engineers, and/or others having knowledge of error messages that may be encountered as a result of products or devices located within or connected to the system 102, provide the error messages to the storage device 252. The error messages may be provided to the error message portion 256 via the input devices 226 (FIG. 3) for storage within the knowledge repository 254. Since the operation manager 100 is capable of communicating via the DSL or POTS line, the error messages may also be provided to the knowledge repository 254 via a location that is distant from the operation manager 100.

A series of message identifier numbers are stored within a message identifier number section 258 of the knowledge repository 254. Preferably, each error message is assigned a single message identifier number such that the size of the error message when stored by the operation manager 100 is reduced from its typically large size, to the size of the identifier number. Further discussion of use of identifier numbers is provided hereinbelow.

A series of root cause proximity (RCP) values are also stored within the knowledge repository 254 within an RCP section 262. The RCP values range from a low number to a large number, preferably from one hundred (100) to one thousand (1000), although it is not necessary that this particular range be utilized. RCP values that are lower in the RCP value range, such as 100 within the current example, indicate a symptom of an error within the system 102 that is not easily attributed to an actual hardware, service, or software problem. An example of such a symptom may be "unable to print," which is merely a symptom since the error message may be attributed to problems attributed to a printer, connections to a computer, local hub connection problems, or any of a large number of problems associated with the system 102.

RCP values that are higher in the RCP value range, such as 900 within the current example, indicate actual failure of components or failing functions that can be directly attributed to a specific device or software product. An example of such a symptom may be "redundant power supply failure." Similarly, RCP values in the middle of the RCP value range are easier to attribute to a component or function than error messages associated with RCP values in the lower area of the spectrum, however, they are not as easily attributed to components or functions as are RCP values in the upper area of the RCP range.

A received message and values section 264 is also provided within the storage device 252, preferably outside of the knowledge repository 254 although it may be located within the knowledge repository 254. The received message and values section 264 may also be located within the memory 222. This section 264 is used for storing message identifier numbers that are associated with received error messages in addition to associated RCP values. Further discussion of the received message and values section 264 is provided hereinbelow with reference to FIGS. 5 and 6.

Figure 5:
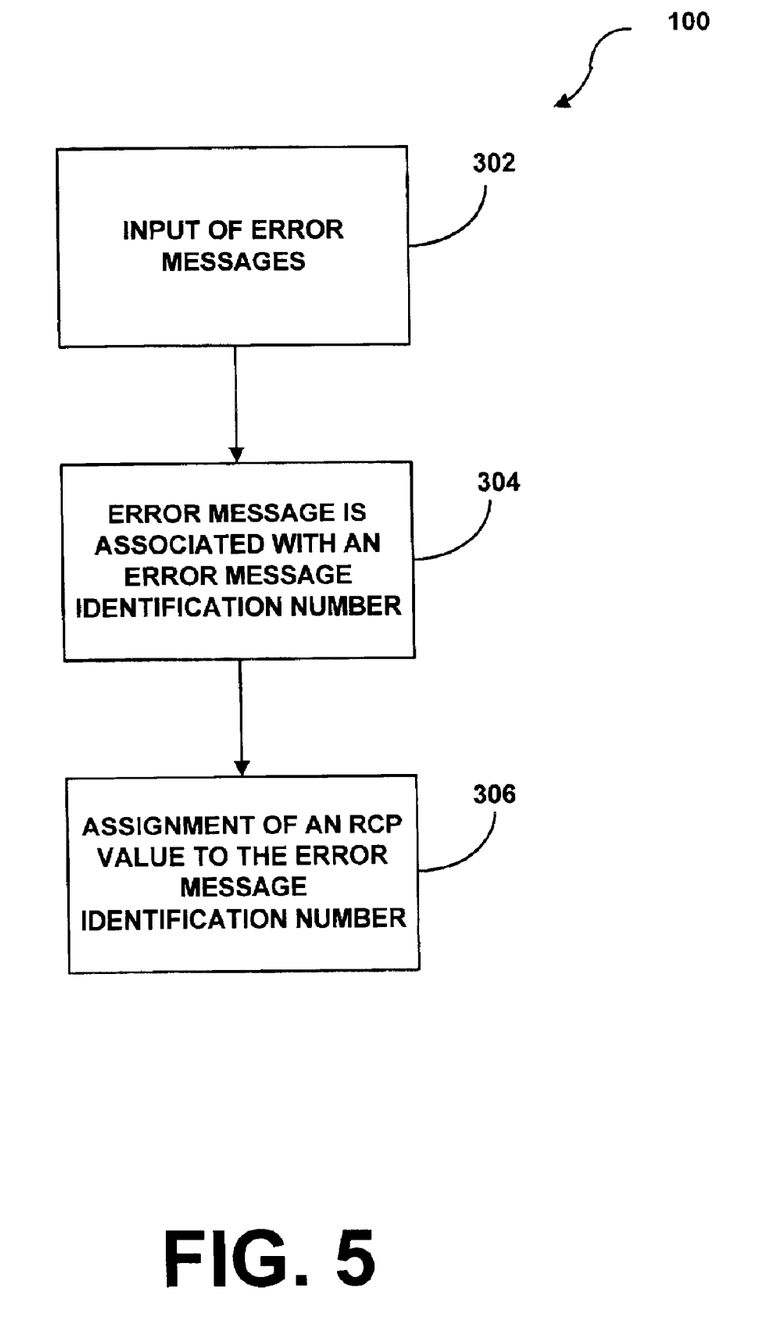
FIG. 5 is a flow chart that illustrates functionality performed to prepare the operation manager of FIG. 3 for receiving error messages.

FIG. 5 is a flow chart that illustrates functionality performed to prepare the operation manager 100 for receiving error messages in accordance with the preferred embodiment of the invention. With regard to the flow chart of FIG. 5, each block represents a module, segment, or portion of code that comprises one or more executable instructions for implementing the specified logical function(s). In some alternate implementations, the functions noted in the blocks may occur out of the order noted. For example, two blocks shown in succession may in fact be executed in the reverse order, depending upon the functionality involved.

As shown by block 302, a network expert inputs error messages into the knowledge repository 254. It should be noted that more than one network expert might input error messages into the knowledge repository 254 from different locations. As an example, network experts may input error messages to the knowledge repository 254 via the Internet, wherein a first network expert is located distant from a second network expert. As noted hereinabove, the error messages are stored within the error message portion 256 of the knowledge repository 254. It should be noted that other individuals, besides the network expert, might input these error messages into the knowledge repository 254.

As shown by block 304, each error message entered is then provided with a message identification number. As mentioned hereinabove, association of each error message with an error message identification number allows storing of a received error message to be small in size.

As shown by block 306, an RCP value is then assigned to each error message identification number. As stated hereinabove, the RCP values assist in determining if a received error message can be attributed to failure of a specific device or function, or if the error message is merely a symptom. The assignment of RCP values allows the operation manager 100 to determine whether a received error message should be neglected, or filtered. As an example, in accordance with a predefined acceptable range of RCP values defined within the memory 222, the operation manager 100 may filter error messages having an RCP value under a specific value. Further explanation of the filtering process is provided hereinbelow with reference to FIG. 6.

Figure 6:
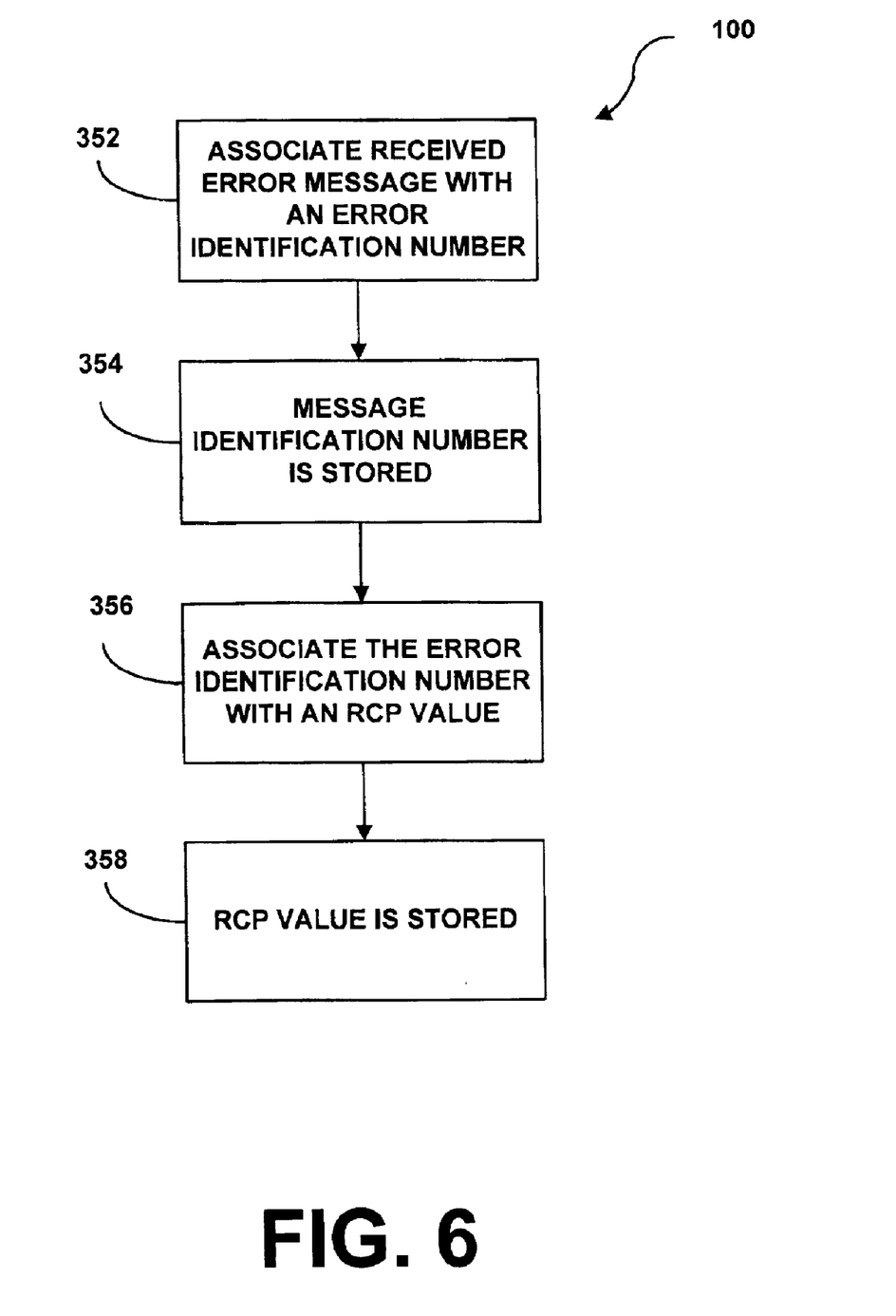
FIG. 6 is a flow chart that illustrates functionality performed by the operation manager of FIG. 3 upon receipt of an error message.

FIG. 6 is a flow chart that illustrates functionality performed by the operation manager 100 upon receipt of an error message. As shown by block 352, when an error message is received by the operation manager 100, the processor 204 within the operation manager 100 determines which error message identification number is associated with the error message by searching the message identifier number section 258. As shown by block 354, the message identification number is then stored within the received message and values section 264 of the storage device 252.

As shown by block 356, an RCP value that is associated with the error message identification number is then determined by the processor 204. The associated RCP value is then stored within the received message and values section 264, along with the message identification number (block 358). It should be noted that the size of the error message identification number and associated RCP value requires much less storage space than would be required to store an entire error message. Further, the use of RCP values provides a useful tool in limiting the number of error messages that are actually viewed and addressed by network personnel and other individuals that receive the error messages, and/or processed by subsequent problem analysis and root cause processing.

Received error messages may be stored within the storage device 252 by numerous ways. As an example, error messages attributed to connection to the WAN 106 may be stored together within the storage device 252, while error messages attributed to connection to the SOHO network 104 may be stored in a separate section of the storage device 252. Further explanation of this method of storage is provided hereinbelow.

A list of all error message identification numbers and associated RCP values may then be presented to a network provider, or user, of the operation manager 100 in the form of a list. Preferably, the list is presented in the order of highest RCP value to lowest RCP value. This order of the list is beneficial since users of the operation manager 100 are most concerned with error messages having high RCP values since these error messages relate directly to devices or functions that may be fixed or corrected. Alternatively, error messages having RCP values that are low within the RCP range merely provide symptoms of network problems that do not signify a direct cause of the of the actual problem. As mentioned hereinabove, filters may also be provided so that the network user receiving the list need only receive the error messages having high RCP values.

Preferably, the knowledge repository 254 manifests itself as an indexed set of advanced encryption standard (AES) encrypted tables. Since information within the knowledge repository may be distributed via electronic and/or mechanical media, strong encryption may be necessary to insure that the contents are protected. Encryption may also be performed between distributed entities such as event processors and/or database/presentation servers to insure that the information is not exposed, even in transient storage or computer memory. Encryption is preferably performed via a generic transmission control protocol (TCP) socket connection using a proprietary scheme and AES encryption, providing a secure virtual private network (VPN) dialog between two services.

In accordance with an alternative embodiment of the invention, the storage device 252 may be divided into multiple different groupings, or orbs. Specifically, the orbs may be classified in accordance with errors relating to specific portions of the system 102, or portions of a network. As an example, a first orb stored within the storage device 252 may store error messages associated with a connection between the operation manager 100 and either the first or second LAN 112, 122; while a second orb is related to connections provided between the operation manager 100 and the WAN 106; and, while a third orb may be used to store error messages related to interaction between the WAN 106 and the SOHO network 104.

While the list of error message identification numbers and associated RCP values is helpful, presentation of the error message identification numbers and associated RCP values may be even more beneficial if a description of the error, probable cause of the error, and remedial action to be taken to solve the error is provided to the network provider or user.

Figure 7:
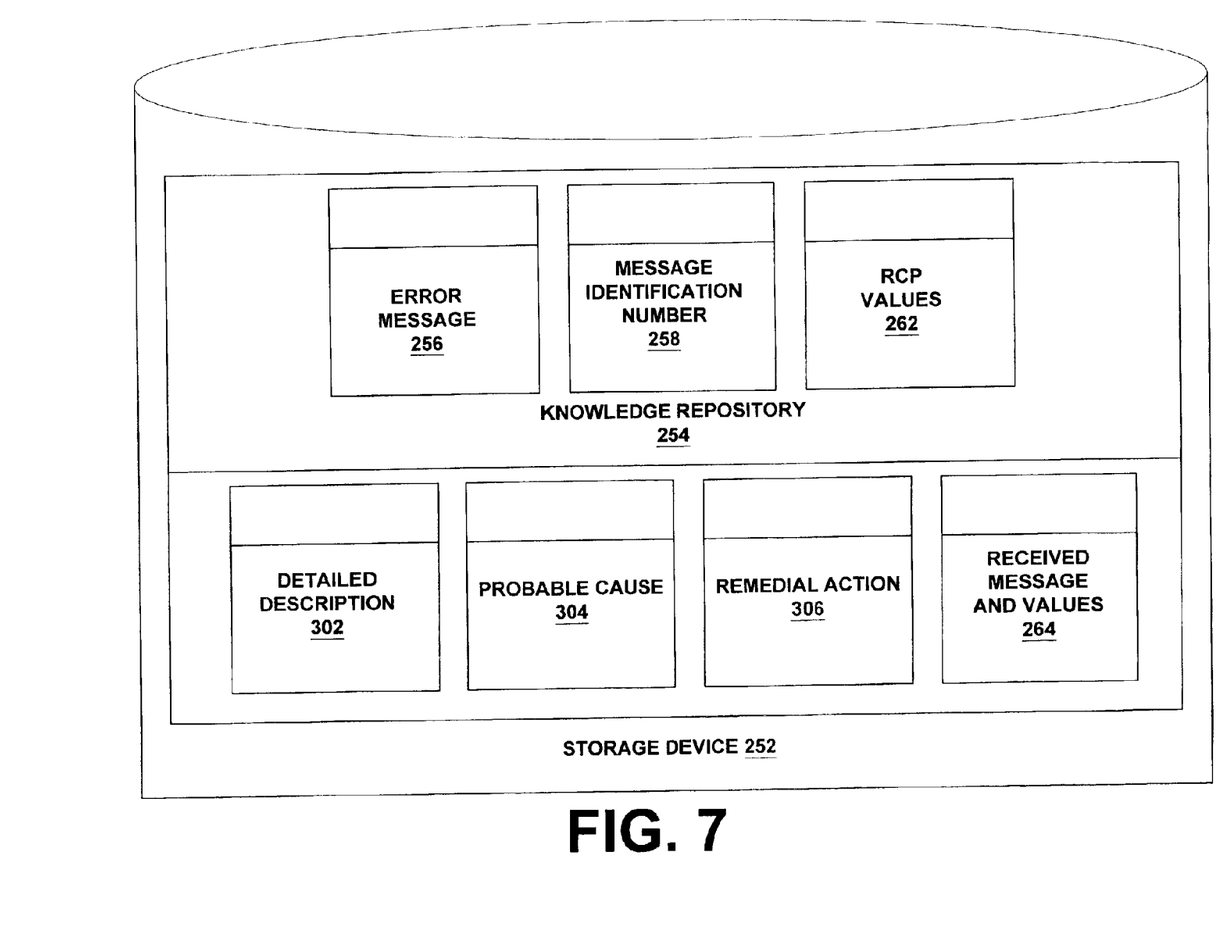
FIG. 7 is a block diagram illustrating the storage device of FIG. 4, in accordance with the alternate embodiment of the invention.

FIG. 7 is a block diagram illustrating the storage device 252 in accordance with a first alternate embodiment of the invention. In accordance with the first alternate embodiment, the storage device 252 located within the operation manager 100 further comprises a detailed description section 302, a probable cause section 304, and a remedial action section 306. After a network expert assigns an error message identification number (block 304, FIG. 5) for a defined error message (block 302, FIG. 5), a detailed description of the error is provided by the network expert, to the storage device 252, via input devices 226. The detailed description of the error message is provided such that a person receiving the detailed description can easily understand the error message.

It should be noted that a detailed description, probable cause, and remedial action might not be required for each error message. As an example, error message identification numbers having a low RCP value that are most likely not to be considered by a network user, may not be provided with the description, probable cause, and remedial action text. Specifically, since error messages having low RCP values are merely symptoms of a problem within the system 102, and therefore, it is much more difficult to associate them with malfunction of hardware, problems with services, or functionality problems within the system 102, there is no need to provide them with a detailed description, probable cause, and remedial action text.

After a clear and concise detailed description of an error message has been provided by a network expert, text providing the probable cause of the error message is also provided by the network expert which is, in turn, stored within the probable cause section 304 of the storage device 252. Remedial actions that may be performed to address the cause of the error message are then provided by the network expert, which are stored within the remedial action section 306 of the storage device 252. As a result, presentation of network errors may be provided to a network provider or user by listing the error message identification number, a clear and concise description of the error message, the probable cause of the error message, and remedial actions that may be taken to solve the cause of the error message.

The presentation of these standardized textual conventions to network users minimizes technical expertise needed by the user since all attributes of the error message, including a clear and concise detailed description, probable cause, and remedial action to be taken, have already been provided by a network expert prior to reception of the error message by the user. In addition, use of the same text to describe the error message and to provide potential solutions to the problems associated with the error message assures that the same remedial procedures are being performed by all receivers of the error message, thereby minimizing chances of improper remedial actions being taken to solve system, or network problem.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The following is claimed:

1. A system for determining a cause of a network problem between a first endpoint and a second endpoint, comprising:
   a first computer comprising;
      a transceiver;
      software stored within said first computer defining functions to be performed; and
      a processor configured by said software to perform the steps of,
         associating a received error message with an error identification number; and
         associating said error identification number with a root cause proximity value, wherein said root cause proximity value represents a relationship between said received error message and an actual cause of said network problem, and wherein said root cause proximity value is used to filter said error messages prior to said error messages being transmitted.

2. The system of claim 1, wherein said actual cause is selected from the group consisting of malfunction of hardware, malfunction of software, or problems with provided services associated with said network.

3. The system of claim 1, further comprising a database that stores said error identification number and said associated root cause proximity value.

4. The system of claim 1, wherein said root cause proximity value is within a range from a small numerical value to a large numerical value, wherein an error message having said small root cause proximity numerical value represents a symptom at said actual cause of said network problem, and an error message having said large root cause proximity numerical value is representative of hardware, services, or software that is said actual cause of said network problem.

5. The system of claim 1, wherein said processor is further configured by said software to perform the step of,
   associating said received error message with a detailed description of amid error message.

6. The system of claim 5, wherein said detailed description of said error message is provided to said system prior to receiving said error message.

7. The system of claim 1, wherein said processor is further configured by said software to perform the step of,
   associating said received error message with a probable cause of sold error message.

8. The system of claim 7, wherein said probable cause of said error message is provided to said system prior to receiving said error message.

9. The system of claim 1, wherein said processor is further configured by said software to perform the step of,
   associating said received error message with a remedial action of said error message.

10. The system of claim 9, wherein sail remedial action of said error message is provided to said system prior to receiving said error message.

11. A system for determining a cause of a problem between a first device and a second device, comprising:
    a first computer comprising;
       a transceiver;
       software stored within said first computer defining functions to be performed; and
       a processor configured by said software to perform the steps of,
          associating a received error message with an error Identification number; and
          associating said error identification number with a root cause proximity value, said root cause proximity value representing a relationship between said received error massage end an actual cause of said problem, wherein said root cause proximity value is within a range from a small numerical value to a large numerical value, and wherein an error message having said small root cause proximity numerical value represents a symptom of said actual cause of said problem, and an error message having said large root cause proximity numerical value is representative of hardware, services, or software that is said actual cause of said problem between said first device and said second device.

12. A system for determining a cause of a network problem between a first endpoint and a second endpoint, comprising:
    means for associating a received error message with an error identification number; and
    means for associating said error identification number with a root cause proximity value, wherein said root cause proximity value represents a relationship between the received error message and an actual cause of said network problem. and wherein said root cause proximity value is used to filter said mesas es or said error messages being transmitted.

13. The system of claim 12, wherein said actual cause is selected from the group consisting of malfunction of hardware, malfunction of software, or problems with provided services associated with said network.

14. The system of claim 12, further comprising moans for storing said error Identification number and said associated root cause proximity value.

15. The system of claim 12, wherein said root cause proximity value is within a range from a small numerical value to a large numerical value, wherein an error message having said small root cause proximity numerical value represents a symptom of said actual cause of said network problem, and an error message having said large root cause proximity numerical value is representative of hardware, services, or software that is said actual cause of said network problem.

16. The system of claim 12, further comprising means for associating said received error massage with a detailed description of said error message.

17. The system of claim 16, wherein said detailed description of said error message is provided to said system prior to receiving said error message.

18. The system of claim 12, further comprising means for associating said received error message with a probable cause of said error message.

19. The system of claim 18, wherein said probable cause of said error message is provided to said system prior to receiving said error message.

20. The system of claim 12, further comprising means for associating said received error message with a remedial action of said error message.

21. The system of claim 20, wherein said remedial action of said error message is provided to said system prior to receiving said error message.

22. A method for determining a cause of a network problem between a first endpoint and a second endpoint, comprising the steps of:

associating a rceived error message with an error identification number; and associating said error identification number with a root cause proximity value, wherein said root cause proximity value represents a relationship between said received error message and an actual cause of said network problem, and wherein said root cause proximity value is used to filter said error messages prior to said error messages being transmitted.

23. The method of claim 22, wherein said actual cause is selected from the group consisting of malfunction of hardware, malfunction of software, or problems with provided services associated with said network.

24. The method of claim 22, further comprising the step of storing said error identification number and said associated root cause proximity value.

25. The method of claim 22, wherein said root cause proximity value is within a range from a small numerical value to a large numerical value, wherein an error message having said small root cause proximity numerical value represents a symptom of said actual cause of said network problem, and an error message having said large root cause proximity numerical value is representative of hardware, services, or software that is said actual cause of said network problem.

26. The method of claim 22, further comprising the step of associating said received error message with a detailed description of said error message.

27. The method of claim 26, wherein said detailed description of said error message is provided prior to receiving said error message.

28. The method of claim 22, further comprising the step of associating said received error message with a probable cause of said error message.

29. The method of claim 28, wherein said probable cause of said error message is provided prior to receiving said error message.

30. The method of claim 22, further comprising the step of associating said received error message with a remedial action of said error message.

31. The method of claim 30, wherein said remedial action of said error message is provided prior to receiving said error message.

* * * * *